March 10, 1970     H. E. PERRAS     3,499,189

CARTRIDGE HEATER FOR COLD MANIFOLD MOLD

Filed Nov. 29, 1967

INVENTOR.
HENRY A. PERRAS
BY Kenwood Ross and
Chester E. Havin
ATTORNEYS.

United States Patent Office 3,499,189
Patented Mar. 10, 1970

3,499,189
CARTRIDGE HEATER FOR COLD MANIFOLD MOLD
Henry A. Perras, Easthampton, Mass., assignor to Osley & Whitney, Inc., Westfield, Mass., a corporation
Filed Nov. 29, 1967, Ser. No. 686,444
Int. Cl. B29f 1/08
U.S. Cl. 18—30      1 Claim

ABSTRACT OF THE DISCLOSURE

The combination with a cold manifold for an injection molding machine of a heating means disposed internally of the cold manifold in each of the sprue channels and runners thereof, each heating means being individually and independently controlled with temperature sensing means disposed internally of each heating means for sensing and indicating the temperature of the plastic material flowing through the channels or runners circumscribing the heating means.

BACKGROUND OF THE INVENTION

Field of the invention

Temperature sensing means for cold manifold injection molding machines.

Description of the prior art

To my knowledge, no one has devised means for determining the exact temperature of the plastic material in the channels and runners interiorly of the mold and at the inlets to the mold cavities.

SUMMARY OF THE INVENTION

The invention provides temperature sensing means integral with the heating element wherefore exact temperature readings may be obtained at any desired location interiorly of the mold.

The invention hereof is intended to apply to machines for molding thermoplastic, thermoset and rubber material.

Especially with regard to the molding of rubber, the temperature must be exactly controlled so that the rubber does not vulcanize. Such exact control is obtained herein.

It has been known to use surface pyrometers but same do not give exact temperature readings.

By this invention, the temperature of the material is exactly indicated at every position from its entry into the mold to its entry into the cavity, thereby insuring against any degrading thereof.

DESCRIPTION OF THE PREFERRED EMBODIMENTS

Figure 1:
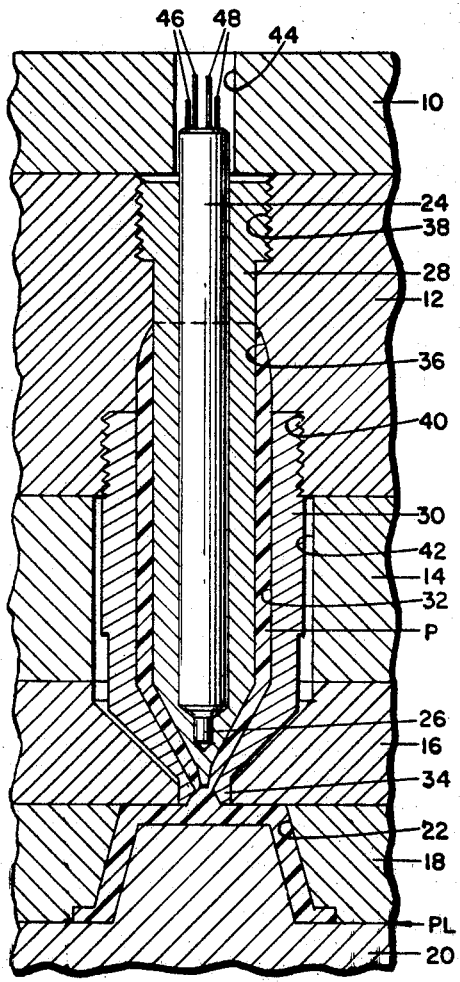
FIG. 1 is a fragmentary cross-sectional view taken through a section of a cold manifold mold incorporating a torpedo, cartridge heater and temperature sensing means embodying one form of the invention.

In FIG. 1, I have shown an internally heated, cold manifold mold of a type and construction suitable for incorporation in any conventional injection molding machine and including in descending stacked relation a top plate 10, a manifold 12, a back-up plate 14, a cavity-retainer plate 16, a female mold part 18 and a male mold part 20 separable at a parting line PL and defining therebetween a plurality of mold cavities 22 which may be of any desired configuration.

Axially aligned, vertically-disposed communicating openings are provided in top plate 10, manifold 12, back-up plate 14 and cavity-retainer plate 16, which latter opening communicates with cavity 22.

Disposed within these openings is a heating element embodying one form of the invention and comprising a heating cartridge 24 having temperature sensing means in the form of a thermocouple tip or sensor element 26 protruding outwardly from its lower end, the whole being tightly sheathed by a shank or torpedo 28 which is, in turn, circumscribed by a nozzle 30, there being a space between the torpedo and the nozzle defining a passageway 32 through which molten material P may flow, the material P exiting into cavity 22 through a nozzle tip 34, having entered the passageway through a communicating inlet opening 36 provided in manifold 12 and circumscribing torpedo 28.

As aforesaid, the material P may be thermoplastic, thermoset or rubber.

Torpedo 28 is threadedly engaged at its upper end in a provided threaded opening 38 adjacent the upper plane of manifold 12.

Nozzle 30 is threadedly engaged at its upper end in a provided threaded opening 40 adjacent the lower plane of manifold 12.

The nozzle is also circumscribed by a channel 42 in which a cooling medium may be circulated.

Cartridge 24 extends outwardly from the upper end of torpedo 28 into a provided opening 44 in top plate 10, the cartridge having longitudinally-extending heating wires 46 embedded therein and extending outwardly from the upper end thereof and through opening 44 to a device sold under the trademark Powerstat provided in a suitable control panel, not shown, wherefore the electric current supplied to the cartridge may be varied and controlled.

Sensor wires 48 are also embedded in the cartridge, being connected at their lower ends to temperature sensing means 26 and extending outwardly from the upper end of the cartridge through opening 44 to a heat indicator, not shown, for recording the exact temperature of the plastic material as it enters the mold cavity.

Figure 2:
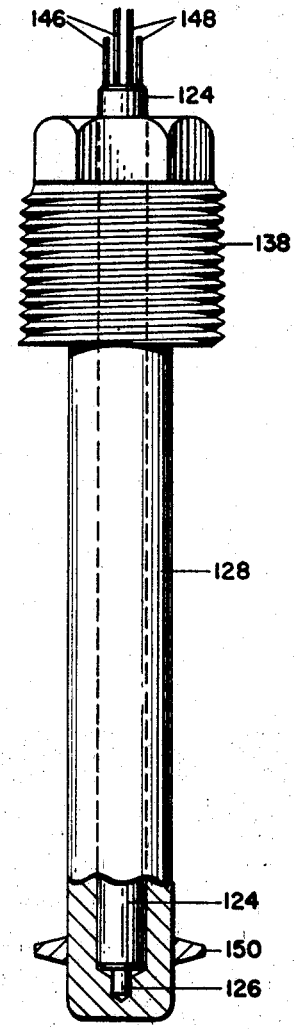
FIG. 2 is an elevational view of a torpedo, cartridge heater and temperature sensing means embodying another form of the invention, parts having been broken away for clarity.
Figure 3:
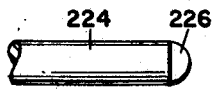
FIGS. 3–9 are fragmentary elevational views of several forms of temperature sensing means configured for special applications and embodying the spirit of the invention.
Figure 4:
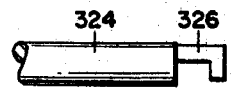
Figure 5:
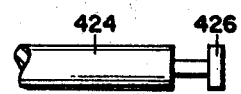
Figure 6:
Figure 7:
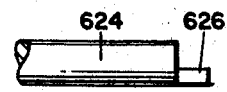
Figure 8:
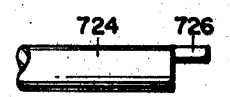
Figure 9:
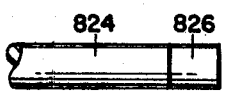

In FIG. 2, I have shown a heating element of the type normally used in the somewhat elongated horizontally-extending material channels of the mold and comprising a heating cartridge 124 having temperature sensing means in the form of a thermocouple tip or sensor element 126 protruding outwardly from its inner end, the whole being tightly sheathed by a shank or torpedo 128, threaded at its outer end as at 138.

The heating element of FIG. 2 because of its length, and because it is normally used without a nozzle, is provided with a plurality of radially outwardly-extending lugs or projections 150 at its innermost end in order to retain such end, and the heating element as a whole, in proper concentric relation to its channel, its opposite end being threadedly engaged in the channel.

Cartridge 124 extends outwardly from the upper end of torpedo 128 and has longitudinally-extending heating wires 146 embedded therein and extending outwardly from the upper end thereof to a Powerstat provided in a suitable control panel, wherefore the electric current supplied to the cartridge may be varied and controlled.

Sensor wires 148 are also embedded in the cartridge, being connected at their inner ends to temperature sensing means 126 and extending outwardly from the outer end of the cartridge to a heat indicator, not shown, for recording the exact temperature of the plastic material in the channel in which the heating element is disposed.

Sensor elements embodying the invention may be of virtually unlimited diameter, length and configuration.

Where high thermal conductivity is the desideratum, the sensors will preferably be fabricated from copper, bronze, silver or similar material.

Where low thermal conductivity is the desideratum, they are preferably fabricated from a metal such as stainless steel.

FIGS. 3-9 show several, but not all, of the possible sensor configurations and placements relative to the end of the cartridge heater. In these figures, the ending digits 24 indicate the cartridge heater and the ending digits 26 indicate the sensor element.

The particular sensor configuration used and its placement relative to the end of the cartridge will be dictated by the particular application in which it is to be employed.

Since each cartridge heater is governed by its own Powerstat and each sensor gives its own reading at its own heat indicator, it is possible to control to an extremely accurate degree the temperature of the material not only in the mold channels, but also at the inlet openings to the mold cavities.

I claim:
1. In combination with a cold manifold for an injection molding machine, heating means disposed internally of the manifold in each of the sprue channels and runners thereof, each such heating means being individually and independently controlled, and temperature sensing means disposed internally of each said heating means and having an inboard end protruding from the heating means at the lower end thereof and adjacent the discharge of the respective channel or runner for sensing and indicating the temperature of the plastic material flowing through the channel or runner adjacent the heating means.

References Cited

UNITED STATES PATENTS 3,189,948  6/1965  Whitney.
2,436,869  3/1948  Lester.

TRAVIS S. McGEHEE, Primary Examiner

H. A. KILBY, JR., Assistant Examiner